US012713220B2

(12) United States Patent
Byun

(10) Patent No.: US 12,713,220 B2
(45) Date of Patent: Aug. 18, 2026

(54) METHOD AND APPARATUS FOR PROVIDING EDGE COMPUTING SERVICE

(71) Applicant: SAMSUNG ELECTRONICS CO., LTD., Suwon-si (KR)

(72) Inventor: Dongwoo Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 18/229,011

(22) Filed: Aug. 1, 2023

(65) Prior Publication Data

US 2023/0379786 A1 Nov. 23, 2023

Related U.S. Application Data

(63) Continuation of application No. PCT/KR2021/019549, filed on Dec. 21, 2021.

(30) Foreign Application Priority Data

Feb. 10, 2021 (KR) ........................ 10-2021-0018998

(51) Int. Cl.

| | |
|---|---|
| ***H04W 8/18*** | (2009.01) |
| ***H04W 36/12*** | (2009.01) |
| ***H04W 36/32*** | (2009.01) |
| ***H04W 36/38*** | (2009.01) |

(52) U.S. Cl.

CPC ........... *H04W 8/18* (2013.01); *H04W 36/125* (2018.08); *H04W 36/322* (2023.05); *H04W 36/38* (2013.01)

(58) Field of Classification Search

CPC ... H04W 36/13; H04W 36/322; H04W 36/12; H04W 36/385

See application file for complete search history.

(56) References Cited

U.S. PATENT DOCUMENTS

| | | | |
|---|---|---|---|
| 10,667,187 | B2 | 5/2020 | Zhu et al. |
| 10,716,034 | B2 | 7/2020 | Trang et al. |
| 10,841,974 | B1 | 11/2020 | Young et al. |
| 11,134,127 | B2 | 9/2021 | Lee et al. |
| 11,218,553 | B2 | 1/2022 | Filippou et al. |
| 2014/0043993 | A1 | 2/2014 | Sirotkin et al. |

(Continued)

FOREIGN PATENT DOCUMENTS

| | | | |
|---|---|---|---|
| JP | 6623268 | B1 | 12/2019 |
| KR | 10-2018-0112825 | A | 10/2018 |

(Continued)

OTHER PUBLICATIONS

Extended European Search Report dated Jun. 4, 2024, issued by the European Patent Office in European Application No. 21925933.0.

(Continued)

*Primary Examiner* — Barry W Taylor

(74) *Attorney, Agent, or Firm* — Sughrue Mion, PLLC

(57) ABSTRACT

A control method for an edge computing service, includes identifying a terminal corresponding to a subscriber of the edge computing service; detecting a movement of the terminal from a first edge cluster to a second edge cluster; and performing an action, based on the movement of the terminal, related to at least one of a first edge control server of the first edge cluster and a second edge control server of the second edge cluster.

18 Claims, 8 Drawing Sheets

(56) References Cited

U.S. PATENT DOCUMENTS

2019/0045409 A1 2/2019 Rasanen et al.
2019/0124561 A1* 4/2019 Faccin .................. H04W 48/18
2019/0140919 A1 5/2019 Smith et al.
2019/0141142 A1 5/2019 Filippou et al.
2019/0387448 A1 12/2019 Stauffer et al.
2020/0120182 A1 4/2020 Kotecha et al.
2020/0259896 A1* 8/2020 Sachs .................. H04L 63/0428
2020/0374740 A1* 11/2020 So ....................... H04L 43/0817
2022/0360645 A1* 11/2022 Badic ...................... H04L 67/59
2024/0171540 A1* 5/2024 Lisewski ............. H04L 61/4511
2026/0025748 A1* 1/2026 Jha ........................ H04W 24/04

FOREIGN PATENT DOCUMENTS

KR 10-2020-0007754 A 1/2020
KR 10-2020-0106317 A 9/2020
KR 10-2020-0131830 A 11/2020
WO 2017/187011 A1 11/2017
WO 2018/078987 A1 5/2018

OTHER PUBLICATIONS

International Search Report (PCT/ISA/210) issued by the International Searching Authority on Mar. 28, 2022 in corresponding International Application No. PCT/KR2021/019549.
Written Opinion (PCT/ISA/237) issued by the International Searching Authority on Mar. 28, 2022 in corresponding International Application No. PCT/KR2021/019549.
Communication dated May 28, 2026, issued by the Korean Ministry of Intellectual Property in Korean Application No. 10-2021-0018998.

* cited by examiner

METHOD AND APPARATUS FOR PROVIDING EDGE COMPUTING SERVICE

CROSS-REFERENCE TO RELATED APPLICATIONS

This application is a by-pass continuation application of International Application No. PCT/KR2021/019549, filed on Dec. 21, 2021, which is based on and claims priority to Korean Patent Application No. 10-2021-0018998, filed on Feb. 10, 2021, in the Korean Intellectual Property Office, the disclosures of which are incorporated by reference herein their entireties.

BACKGROUND

1. Field

The disclosure relates to a method and an apparatus for providing an edge computing service.

2. Description of Related Art

Edge computing is a technology for performing computing at or close to a physical location of a user or a data source. Edge computing is one of schemes where service providers may distribute data computation and processing across multiple locations by using a shared resource pool. When computing services are processed at locations closer to users' terminals, the users may receive faster and more reliable services, while service providers may utilize flexible characteristics of hybrid cloud computing.

SUMMARY

The disclosure may maintain the continuity of an edge computing service in response to a movement of a terminal between edge clusters.

According to an aspect of the disclosure, a control method for an edge computing service, includes identifying a terminal corresponding to a subscriber of the edge computing service; detecting a movement of the terminal from a first edge cluster to a second edge cluster; and performing an action, based on the movement of the terminal, related to at least one of a first edge control server of the first edge cluster and a second edge control server of the second edge cluster.

According to another aspect of the disclosure, a network core server includes: a processor; and a memory configured to store instructions executable by the processor, wherein, based on the instructions being executed by the processor, the processor is configured to: identify a terminal corresponding to a subscriber of an edge computing service based on service authorization information of the terminal; detect a movement of the terminal from a first edge cluster to a second edge cluster; and perform an action, based on the movement of the terminal, related to at least one of a first edge control server of the first edge cluster and a second edge control server of the second edge cluster, and wherein the service authorization information comprises a user equipment usage type of the terminal.

According to the embodiments of the disclosure, the continuity of an edge computing service may be maintained despite a movement of a terminal between edge clusters.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
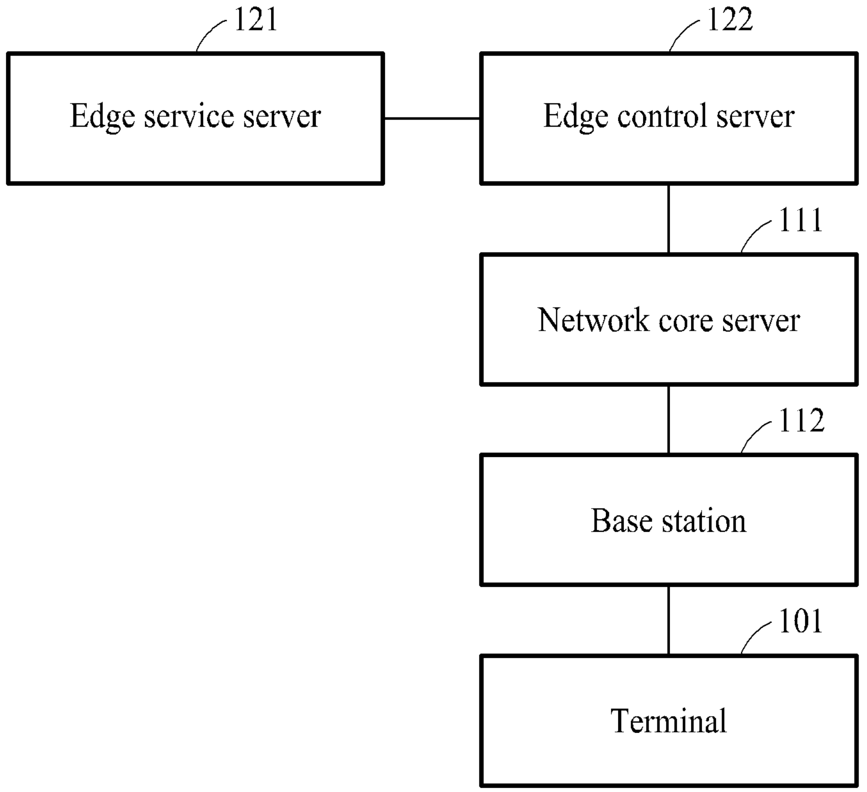
FIG. 1 illustrates a schematic configuration of an edge computing system according to one or more embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates a schematic configuration of an edge computing system according to one or more embodiments. Referring to FIG. 1, a terminal 101 may correspond to a subscriber of a mobile telecommunication service, and in this case, the terminal may receive a mobile telecommunication service through a network core server 111 and a base station 112. For example, the network core server 111 may provide a fourth generation (4G) and/or 5G non-standalone (NSA) mobile telecommunication service, and the base station 112 may be eNodeB (eNB) and/or gNodeB (gNB). The network core server 111 may include or correspond to a mobility management entity (MME) server.

The terminal 101 may correspond to a subscriber of an edge computing service, and in this case, the terminal may receive the edge computing service through an edge service server 121 and an edge control server 122. When subscribing to both the mobile telecommunication service and the edge computing service, the terminal 101 may receive the edge computing service through a mobile telecommunication resource. The network core server 111, the base station 112, the edge service server 121, and the edge control server 122 may correspond to examples of resources providing the mobile telecommunication service and the edge computing service, and alternative resources and/or additional resources may be used for these services.

Edge computing is a technology for performing computing at or close to a physical location of a user or a data source, and an edge computing service is an application service provided through this computing technology. The terminal 101 may register information of the terminal 101 with the edge control server 122 and use the edge computing service through the edge service server 121. Computing resources, such as the edge service server 121 and the edge control server 122, that process the edge computing service may be grouped and managed by predetermined areas, and each area may be referred to as an edge cluster.

When a location of the terminal 101 changes, an edge computing resource located close to the terminal 101 may need to be used in accordance with the change in the location of the terminal 101. More particularly, when the terminal 101 leaves an old edge cluster and enters a new edge cluster, a resource of the new edge cluster may need to be used instead of a resource of the old edge cluster. A mobile telecommunication core network and edge computing have different technical domains, and sharing information between the two domains according to a location change of a mobile telecommunication subscriber is not standardized.

The location of the terminal 101, as a mobile telecommunication subscriber, may be distinguished by the base station 112 to which the terminal 101 is connected. Multiple neighboring base stations may be grouped into one tracking area (TA), and the location of the terminal 101 may be managed for each TA. The network core server 111 may manage a user plane device (e.g., a user gateway such as GW-U) for each TA and enable the terminal 101 to use a user plane device closest to the terminal 101 to receive a service. When a TA of the terminal 101 is changed by a change in the location of the terminal 101 and a user plane covering the TA needs to be changed, the network core server 111 may change the user plane device through a handover procedure.

Edge computing may correspond to the European Telecommunications Standards Institute's (ETSI) multi-access edge computing (MEC). Based on this, the edge service server 121 may correspond to an MEC application, and the edge control server 122 may correspond to an MEC platform. A user, for example, the terminal 101, who desires to use the edge computing service may register user information with the edge control server 122. The terminal 101 may register information of the terminal with the edge control server 122 of an edge cluster to which the terminal belongs. When moving to the new edge cluster, the terminal 101 may newly register the information of the terminal with a new edge control server located in the new edge cluster.

When there is a change in an edge cluster to which a mobile telecommunication subscriber belongs due to a movement of the mobile telecommunication subscriber, a scheme of finding a new edge control server or transmitting user information is not standardized. Edge computing technology is not standardized even in a mobile telecommunication standard (e.g., 4G and/or 5G NSA of 3G partnership projection (3GPP)). When the mobile telecommunication subscriber moves to a new edge cluster area, a core network (e.g., a user plane) to support an edge service also needs to be changed. However, when this change happens while the subscriber receives a service, the service may be disconnected. In addition, even if the subscriber moves to the new edge cluster area, when a mobile telecommunication network does not notify this movement to a control server of an edge service, a connection with an old edge cluster may be cut off, a new edge cluster does not recognize this disconnection, and thus, service interruption may occur.

The network core server 111 may prevent service interruption and/or disconnection and maintain service continuity by replacing a computing resource (e.g., a server and a transmission path) in response to or based on a change in an edge cluster. For example, the network core server 111 may provide continuity of a service when a 4G and/or 5G NSA mobile telecommunication subscriber moves from one edge cluster to another.

Figure 2:
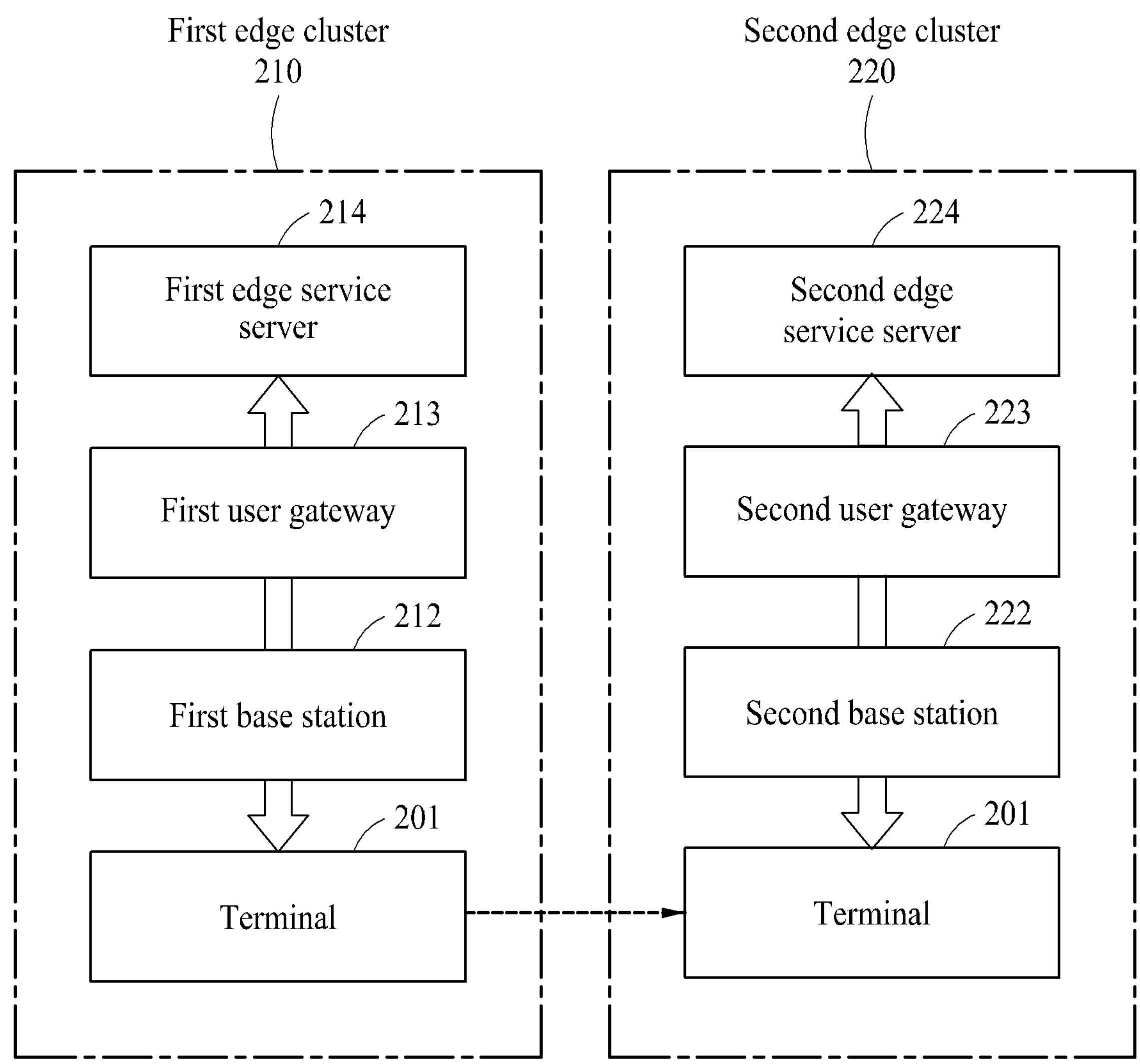
FIG. 2 illustrates a change in connections of an edge computing service in response to a movement of a terminal between edge clusters according to one or more embodiments.

FIG. 2 illustrates a change in connections of an edge computing service in response to or based on a movement of a terminal between edge clusters according to one or more embodiments. Referring to FIG. 2, an edge computing service of a first edge cluster 210 may be provided by a first base station 212, a first user gateway 213, and a first edge service server 214, and an edge computing service of a second edge cluster 220 may be provided by a second base station 222, a second user gateway 223, and a second edge service server 224. When a terminal 201 moves from the first edge cluster 210 to the second edge cluster 220, the first edge cluster 210 may be referred to as an old edge cluster, and the second edge cluster 220 may be referred to as a new edge cluster. In addition, a first edge control server and the first edge service server 214 of the first edge cluster 210 may be referred to as an old edge control server and a new edge service server, respectively, and a second edge control server and the second edge service server 224 of the second edge cluster 220 may be referred to as a new edge control server and a new edge service server, respectively. A location of the terminal 201 may be tracked through the first base station 212 and the second base station 222.

When the terminal 201 moves from the first edge cluster 210 to the second edge cluster 220, an edge cluster to which the terminal 201 belongs may change, and a network core server may perform an appropriate action, resulting from (or based on) the movement of the terminal. For example, an action of the network core server may include an operation of re-selecting a user plane to process traffic of the second edge cluster 220 and an operation of notifying the movement of the terminal 201 to the first edge control server and/or the second edge control server. The first edge control server may notify a change in an edge cluster to the first edge service server, and the second edge control server may notify the change in the edge cluster to the second edge service server, as needed.

As described above, the network core server may include or correspond to an MME server. The MME server may control the mobility of a mobile telecommunication subscriber and a session in a 4G or 5G NSA core network. The MME server may detect the change in the edge cluster as the terminal 201 moves its location and may notify the change in the edge cluster to the first edge control server and/or the second edge control server. In addition, an operation of the network core server according to the disclosure may correspond to an operation of the MME server, and/or the operation of the MME server may correspond to the operation of the network core server.

First, a user plane re-selection operation of the network core server is described. When a core network is based on a control and user plane separation (CUPS) structure, a control plane and a user plane are separated, so that efficient resource management and service provision may be possible. Edge computing may enable selection of a user plane entity close to a mobile telecommunication subscriber to provide low latency.

When the terminal 201 is located in the first edge cluster 210, the first user gateway 213 may correspond to a user plane entity closest to the terminal 201. When the terminal 201 is located in the second edge cluster 220, the second user gateway 223 may be the user plane entity closest to the terminal 202. The network core server may detect the movement of the terminal 201 from the first edge cluster 210 to the second edge cluster 220 and replace a user plane device by replacing the first user gateway 213 with the second user gateway 223 through user plane re-selection in response to or based on the movement of the terminal 201.

In a general handover, a user plane may be changed as coverage of a user plane changes. However, when the user plane is changed while a subscriber is in an active state, service disconnection may occur due to a change in a traffic path. When the terminal 201 in an active state enters the second edge cluster 220, the network core server may delay re-selection until a service state of the terminal 201 becomes an idle state and maintain a path through an old user plane (the first user gateway 213). When the service state of the terminal 201 becomes the idle state, the network core server may re-select the user plane by selecting the second user gateway 223. When the terminal 201 in the idle state enters the second edge cluster 220, the network core server may immediately re-select the user plane. The network core server may prevent service disconnection through these operations.

Next, a notification operation for an edge control server of the network core server is described. The edge service servers (the first edge service server 214 and the second edge service server 224) may subscribe in advance to edge control servers for a change in a location of a predetermined area and/or a predetermined subscriber and provide a service based on a location of a mobile telecommunication subscriber. For example, the edge service servers (the first edge service server 214 and the second edge service server 224) may use a location service application programming interface (API) defined by ETSI, and an MME may manage location information of a subscriber in a 3GPP network core.

The network core server may manage matching relationships between network areas (e.g., TAs and cells) and the edge clusters (the first edge cluster 210 and the second edge cluster 220). For example, a matching relationship may indicate which network areas belong to each of the edge clusters (the first edge cluster 210 and the second edge cluster 220). The network core server may determine a network area to which the terminal 201 belongs through the base stations (the first base station 212 and the second base station 222) and determine an edge cluster to which the terminal 201 belongs through a matching relationship. When a change in the location of the terminal 201 is determined, the network core server may notify the change to an associated edge control server. When the terminal 201 moves between network areas belonging to different edge clusters, the network core server may notify an edge control server covering an old network area that the terminal 201 leaves the old network area and notify an edge control server covering a new network area that the terminal 201 enters the new network area.

The terminal 201 may receive an edge service from the first edge service server 214 using a communication path through the first base station 212 and the first user gateway 213 in the first edge cluster 210. When the terminal 201 leaves the first edge cluster 210 and enters the second edge cluster 220, the network core server may detect the movement of the terminal 201 and notify the movement to the first edge control server of the first edge cluster 210 and/or the second edge control server of the second edge cluster 220. The first edge control server may stop providing a service of the first edge service server 214, and the second edge control server may start providing a service of the second edge service server 224. The network core server may re-select a control plane while considering a service state. Accordingly, the terminal 201 may receive an edge service from the second edge service server 224 using a communication path through the second base station 222 and the second user gateway 223 in the second edge cluster 220.

The network core server may be aware that the terminal 201 corresponds to a mobile telecommunication subscriber but may not be aware that the terminal corresponds to an edge computing service subscriber. In this case, the network core server may verify whether the terminal 201 corresponds to the subscriber of the edge computing service and perform a notification operation for the edge control server only when the terminal 201 corresponds to the subscriber of the edge computing service. The network core server may provide information on all edge service target subscribers to the edge control server when each of the subscribers changes location. The edge control server may cache this information to respond to a request from the edge service server.

The network core server may determine whether the terminal corresponds to the subscriber of the edge computing service based on service authorization information of the terminal 201. For example, information on services provided to a long timer evolution (LTE) subscriber may be stored in a home subscriber server (HSS). Service authorization information of a subscriber stored in the HSS may include a user equipment (UE) usage type. A mobile telecommunication service provider may assign a predetermined value (e.g., an "MEC" value) to a UE usage type of the subscriber of the edge computing service, and the network core server may identify a mobile telecommunication subscriber having a UE usage type corresponding to the predetermined value as the subscriber of the edge computing service and transmit information on the subscriber to the edge control server.

The network core server may transmit recent location information to the edge control server when a location of the subscriber having the UE usage type changes, regardless of whether the edge service server requests location tracking. The edge control server may request subscriber information to the network core server to audit the subscriber information when necessary. For example, the network core server may transmit information on the mobile telecommunication subscriber to the edge control server using a user datagram protocol (UDP). In this case, a message may be composed according to a general packet radio service (GPRS) tunneling protocol (GDP) (e.g., GTP-C v2).

A message used for the edge computing service may include a request message and a response message. For example, when the terminal leaves the old edge cluster, when the terminal enters the new edge cluster, when a cell change of the terminal is detected, or when there is an audit query for the terminal, the subscriber information may be transmitted through a corresponding message. The subscriber information may include at least one of international mobile subscriber identity (IMSI), an internet protocol (IP) address, an evolved universal terrestrial access network (E-UTRAN) cell global identifier (EGCI), a tracking area identifier (TAI), an access point name network identifier (APNNI), and a UE usage type of the terminal. IMSI and IP address may correspond to identification information of the terminal, and EGCI, TAI, and APNNI may correspond to location information of the terminal.

The request message may have a format shown in Table 1 below.

TABLE 1

| Message Header |
| --- |
| IMSI (M) |
| IP Address1 (O) |
| IP Address2 (O) |
| ECGI (0) |
| TAI |
| APNNI |
| UE Usage Type |

When the terminal enters the new edge cluster, the network core server may transmit a subscriber activate request message to the edge control server of the new edge cluster. The subscriber activate request message may include all fields of a request message format. The request message format includes two IP address fields, and when the terminal does not use a Dual 2 IP address, only one of the two IP address fields may be used. When the terminal enters the new edge cluster, the network core server may transmit a subscriber delete request message to the edge control server of the old edge cluster. The subscriber delete request message may include only an IMSI field of the request message format. When the terminal moves between cells in a current edge cluster, the network core server may transmit a subscriber modify request message to the current edge cluster. The subscriber modify request message may include an IMSI field, an IP address field, and an ECGI field.

A message header field of the request message may be defined as shown in Table 2 below.

TABLE 2

| | |
|---|---|
| Octet1 | Message Tag = 1 |
| Octet2 | Length |
| Octet3 | Length |
| Octet4 | Sequence Number |
| Octet5 | Sequence Number |
| Octet6 | Sequence Number |
| Octet7 | Spare |
| Octet8 | Payload Data |

First six bytes may be fixed for a message header, and a first byte of any message may indicate whether a type of a message corresponds to a request or a response.

An IP address field of the request message may be defined as shown in Table 3.

TABLE 3

| | |
|---|---|
| Octet1 | Type = 1 (IPV4) Type = 2(IPV6) |
| Octet2 | Length |
| Octet3 | Length |
| Octet4 to Octet19 (or) Octet4 to Octet7 | IPV4/IPv6Address |

The IP address field may support the Dual 2 IP address (e.g., IPV4 and IPV6). Length 4 may be used for IPV4, and Length 16 may be used for IPV6.

An IMSI field of the request message may be defined as shown in Table 4.

TABLE 4

| | | |
|---|---|---|
| Octet1 | Type = 3 | |
| Octet2 | Length | |
| Octet3 | Length | |
| Octet4 | Number Digit 2 | Number Digit 1 |
| Octet5 | Number Digit 4 | Number Digit 3 |
| Octet6 | Number Digit 6 | Number Digit 5 |
| Octet7 | . . . | . . . |
| Octet11 | Number Digit M | Number Digit M − 1 |

Octets 4 to 11 may represent IMSI values in an international number format encoded as Tubulin-specific chaperone D (TBCD) digits. For example, digits from 0 through 9 may be encoded "0000" through "1001". When there is an odd number of digits, bits 8 to 5 of the last octet may be encoded with a filler "1111". A maximum number of digits may be 15.

An ECGI field of the request message may be defined as shown in Table 5.

TABLE 5

| | | |
|---|---|---|
| Octet1 | Type = 4 | |
| Octet2 | Length | |
| Octet3 | Length | |
| Octet4 | MCC digit 2 | MCC digit 1 |
| Octet5 | MNC digit 3 | MCC digit 3 |
| Octet6 | MNC digit 2 | MNC digit 1 |
| Octet7 | Spare | ECI |
| Octet8 to 10 | ECI (E-UTRAN Cell Identifier) | |

ECGI (or ECI) may include 28 bits. The ECGI field may start with bit 4 of Octet7, which corresponds to a most significant bit. Bit 1 of Octet10 may correspond to a least significant bit. ECGI may be encoded under the responsibility of each administration, and a full hexadecimal representation may be used for coding.

A TAI field, a UE usage type field, and an APNNI field of the request message may be defined as shown in Tables 6 to 8.

TABLE 6

| | | |
|---|---|---|
| Octet1 | Type = 6 | |
| Octet2 | Length | |
| Octet3 | Length | |
| Octet4 | MCC digit 2 | MCC digit 1 |
| Octet5 | MNC digit 3 | MCC digit 3 |
| Octet6 | MNC digit 2 | MNC digit 1 |
| Octet7 | Tracking Area Code (TAC) | |

TABLE 7

| | |
|---|---|
| Octet1 | Type = 7 |
| Octet2 | Length |
| Octet3 | Length |
| Octet4 | UE Usage Type |

TABLE 8

| | |
|---|---|
| Octet1 | Type = 8 |
| Octet2 | Length |
| Octet3 | Length |
| Octet4 . . . n | APNNI |

An APNNI of the APNNI field may be encoded as one character per octet.

The response message may have a format shown in Table 9.

TABLE 9

| |
|---|
| Message Header Tag = 2 (Response) |
| Cause |

A 'Cause' field of the response message may be defined as shown in Table 10, and Cause values may be defined as shown in Table 11.

TABLE 10

| | |
|---|---|
| Octet1 | Type = 5 |
| Octet2 | Length |
| Octet3 | Length |
| Octet4 | Cause |

TABLE 11

| Cause Value | Description |
|---|---|
| 0 | Success |
| 1 | Failure |
| 2 | Mandatory IE Missing |
| 3 | Context Not Found |

Figure 3:
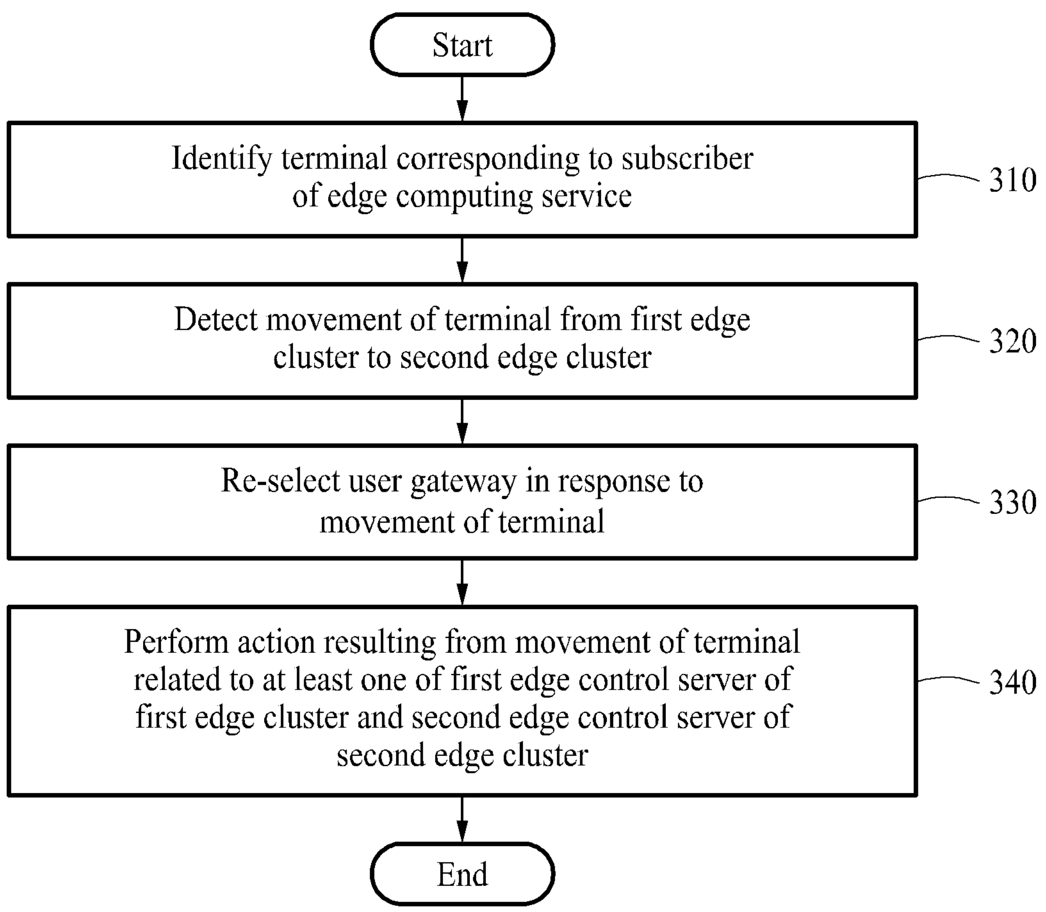
FIG. 3 illustrates control operations for an edge computing service according to one or more embodiments.

FIG. 3 is a flowchart illustrating control operations for an edge computing service according to one or more embodiments. Referring to FIG. 3, in operation 310, a network core server may identify a terminal corresponding to a subscriber of an edge computing service. The network core server may identify the terminal corresponding to the subscriber of the edge computing service based on service authorization information of the terminal. The service authorization information may include a UE usage type of the terminal stored in an HSS.

In operation 320, the network core server may detect a movement of the terminal from a first edge cluster to a second edge cluster. The first edge cluster may correspond to an old edge cluster, and the second edge cluster may correspond to a new edge cluster. The network core server may detect a change in an edge cluster through the movement of the terminal from a first network area (e.g., a TA) belonging to the first edge cluster to a second network area belonging to the second edge cluster.

In operation 330, the network core server may perform an action, resulting from (or based on) the movement of the terminal, related to at least one of a first edge control server of the first edge cluster and a second edge control server of the second edge cluster. The network core server may request the first edge control server to delete subscriber information of the terminal and transmit the subscriber information of the terminal to the second edge control server. The subscriber information may include at least one of IMSI, an IP address, an EGCI, a TAI, an APNNI, and a UE usage type of the terminal. When a cell change of the terminal is detected in the second edge cluster, the network core server may notify the cell change of the terminal to the second edge control server.

When receiving an audit query for the terminal from a third edge control server of a third edge cluster, the network core server may transmit the subscriber information of the terminal to the third edge control server. For example, when the terminal moves to the third edge cluster and requests a service to the third edge control server and/or the third edge service server of the third edge cluster but the third edge control server and/or the third edge service server is not aware of information on the terminal, the third edge control server and/or the third edge service server may need to verify the information on the terminal. In this case, the third edge control server and/or the third edge service server may request an audit query for the terminal to the network core server.

The network core server may re-select a user plane device in response to the movement of the terminal. When the terminal moves from the first edge cluster to the second edge cluster, the network core server may select a user plane device closest to the second edge cluster. When the terminal moves from the second edge cluster to the third edge cluster, the network core server may select a user plane device closest to the third edge cluster. When a service state of the terminal is an active state, the network core server may delay the re-selection until the service state becomes an idle state. When the service state is an idle state, the network core server may perform the re-selection.

Figure 4:
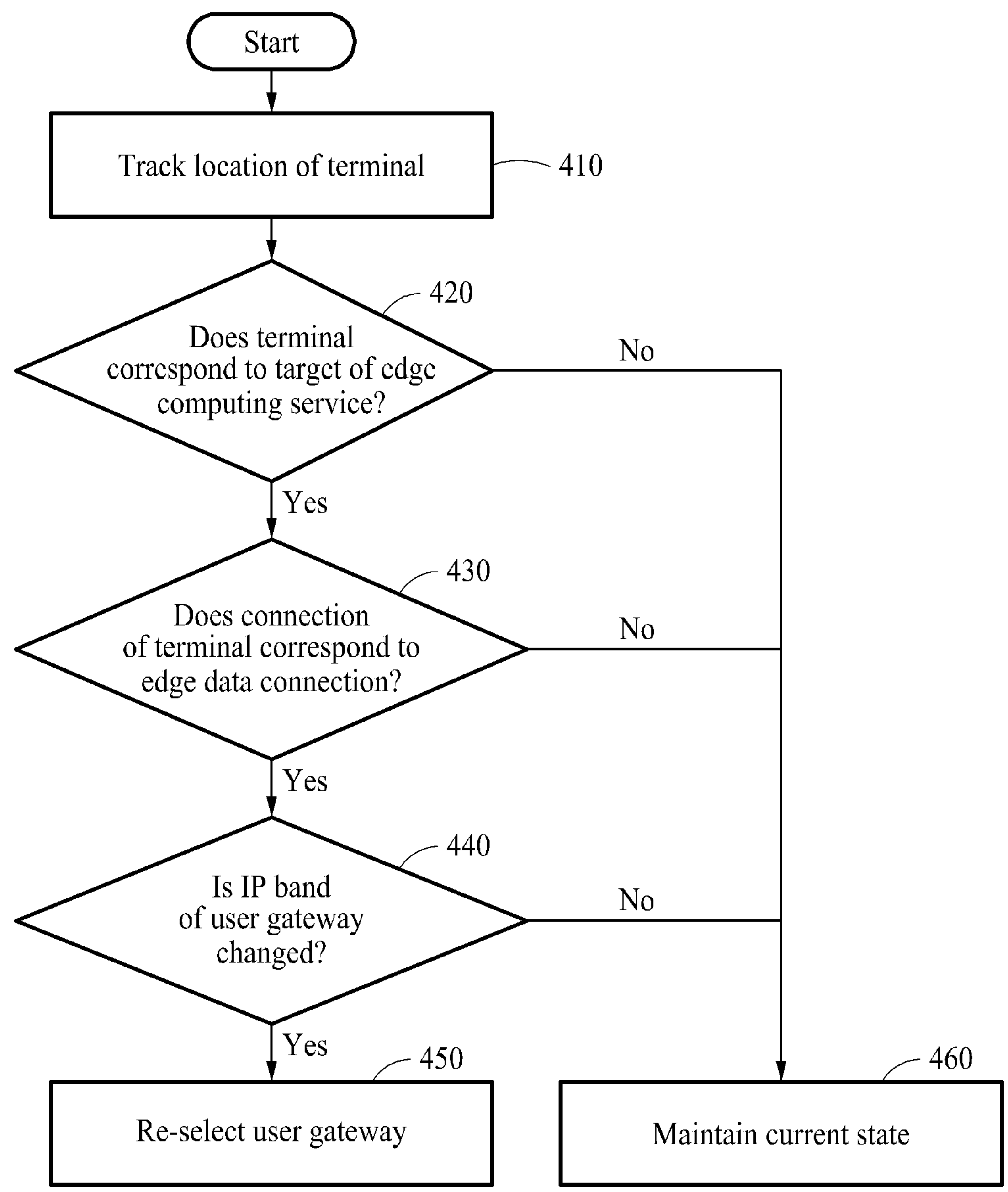
FIG. 4 illustrates a user gateway re-selection operation according to one or more embodiments.

FIG. 4 is a flowchart illustrating a user gateway re-selection operation according to one or more embodiments. Referring to FIG. 4, in operation 410, a network core server may track a location of a terminal. The network core server may track the location of the terminal through a base station. For example, when the location of the terminal corresponding to a mobile telecommunication subscriber is changed, the base station may notify a change in the location of the terminal to the network core server (e.g., MME). Location tracking may be performed on a network area (e.g., a TA) basis.

When the location (e.g., a TA) of the terminal is changed, the network core server (e.g., MME) may determine whether to change a user gateway (e.g., GW-U) using mobility information and/or session information of the terminal. More particularly, the network core server may determine whether the terminal corresponds to a target of an edge computing service in operation 420, determine whether a connection of the terminal corresponds to an edge data connection (e.g., a multi-access edge computing packet data network connection) in operation 430, and determine whether an IP band of the user gateway is changed in operation 440.

When the terminal corresponds to the target of the edge computing service, when the connection of the terminal corresponds to the edge data connection, and when the IP band is changed, the network core server may re-select the user gateway in operation 450. When the terminal does not correspond to the target of the edge computing service, when the connection of the terminal does not correspond to the edge data connection, or when the IP band of the user gateway is not changed, the network core server may maintain a current state using an old user gateway in operation 460.

Figure 5:
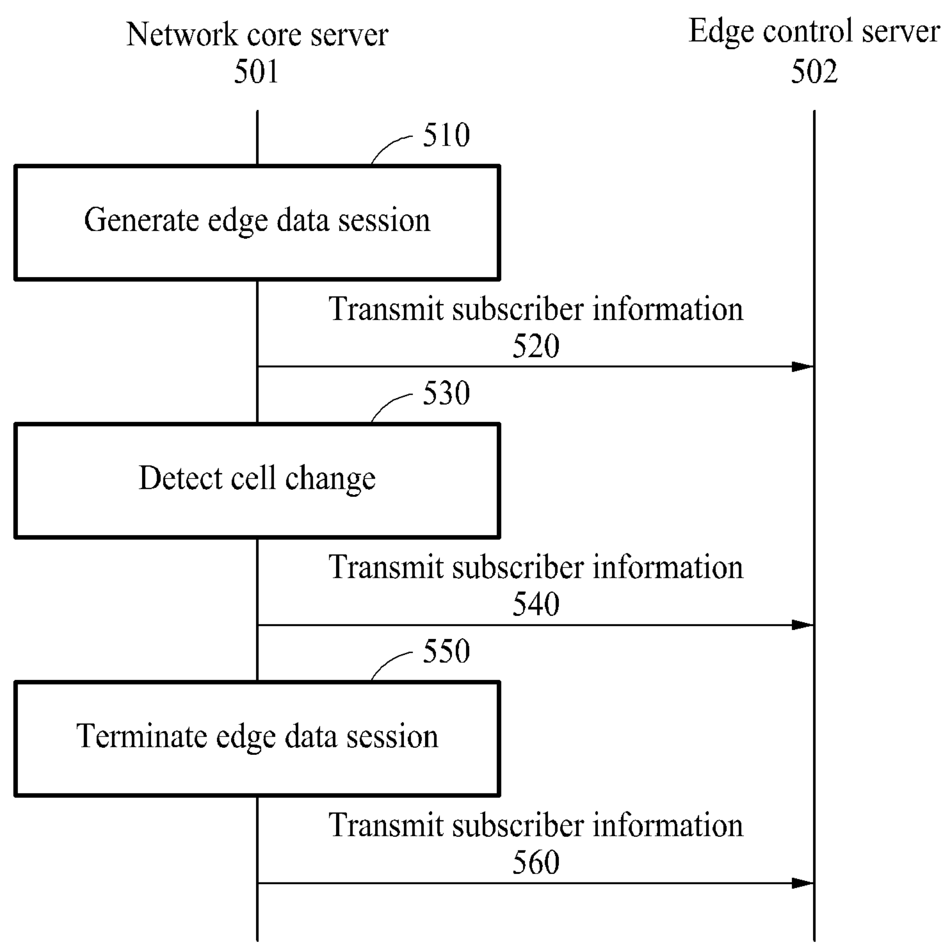
FIG. 5 illustrates operations of a network core server in response to a movement of a terminal according to one or more embodiments.

FIG. 5 illustrates operations of a network core server in response to a movement of a terminal according to one or more embodiments. Referring to FIG. 5, a network core server 501 may generate an edge data session in operation 510 and transmit subscriber information to an edge control server 502 in operation 520. For example, when a terminal enters a new edge cluster and the edge control server 502 is responsible for the new edge cluster, the network core server 501 may generate the edge data session and notify an entry of the terminal into the new edge cluster while transmitting the subscriber information of the terminal to the edge control server 502. The network core server 501 may transmit the subscriber information of the terminal through a subscriber activate request message. The subscriber activate request message may include all fields of a request message format.

The network core server 501 may detect a cell change in operation 530 and transmit the subscriber information to the edge control server 502 in operation 540. For example, when the terminal moves between cells in a current edge cluster, the network core server 501 may detect the cell change and notify the cell change of the terminal while transmitting the subscriber information of the terminal to the edge control server 502 that is responsible for the current edge cluster. The network core server 501 may transmit the subscriber information of the terminal through a subscriber modify request message. The subscriber modify request message may include at least one of an IMSI field, an IP address field, and an ECGI field.

The network core server 501 may terminate the edge data session in operation 550 and transmit the subscriber information to the edge control server 502 in operation 560. For example, when the terminal enters another new edge cluster and the edge control server 502 is responsible for the old edge cluster, the network core server 501 may terminate the old edge data session and notify that the terminal leaves the corresponding edge cluster while transmitting the subscriber information of the terminal to the edge control server 502. The network core server 501 may transmit the subscriber information of the terminal through a subscriber delete request message. The subscriber delete request message may include an IMSI

FIELD

Figure 6:
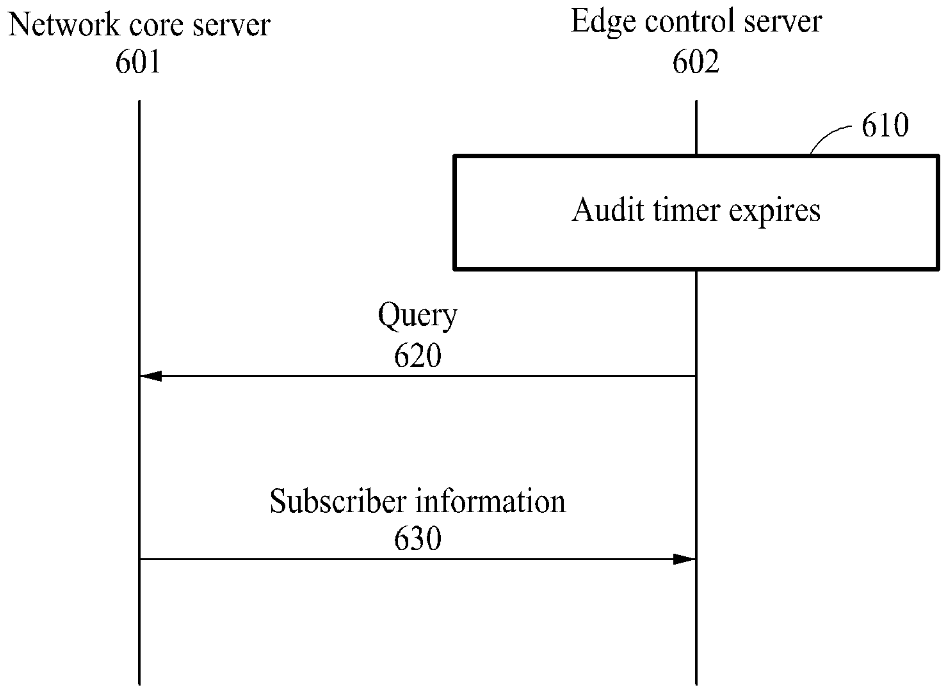
FIG. 6 illustrates audit operations of an edge control server according to one or more embodiments.

FIG. 6 illustrates audit operations of an edge control server according to one or more embodiments. Referring to FIG. 6, in operation 610, an edge control server 602 may check the expiration of an audit timer and send an audit query to a network core server 601. In operation 630, the network core server 601 may transmit subscriber information of a terminal to the edge control server 602. For example, when the terminal moves to a new edge cluster and requests a service to the edge control server 602 and/or an edge service server that is responsible for the new edge cluster but the edge control server 602 and/or the edge service server is not aware of information on the terminal, the edge control server 602 and/or the edge service server may need to verify the subscriber information of the terminal. In this case, the edge control server 602 and/or the edge service server may send an audit query for the terminal to the network core server 601.

Figure 7:
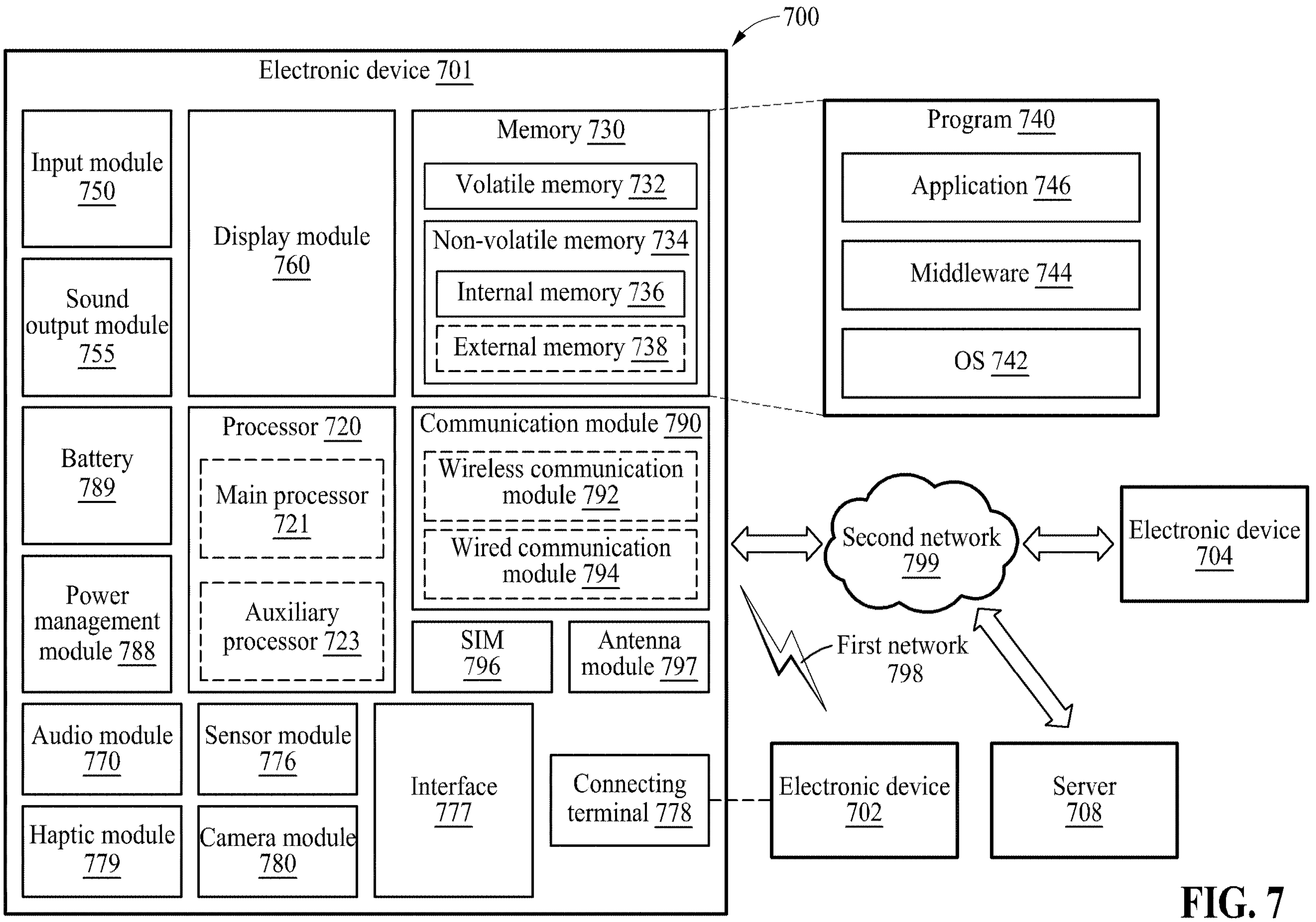
FIG. 7 illustrates an electronic apparatus in a network environment according to one or more embodiments.

FIG. 7 is a block diagram of an electronic apparatus in a network environment according to one or more embodiments. Referring to FIG. 7, an electronic apparatus 701 in a network environment 700 may communicate with an electronic apparatus 702 via a first network 798 (e.g., a short-range wireless communication network), or communicate with at least one of an electronic apparatus 704 or a server 708 via a second network 799 (e.g., a long-range wireless communication network). According to an embodiment, the electronic apparatus 701 may communicate with the electronic apparatus 704 via the server 708. According to an embodiment, the electronic apparatus 701 may include a processor 720, a memory 730, an input module 750, a sound output module 755, a display module 760, an audio module 770, and a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one (e.g., the connecting terminal 778) of the above components may be omitted from the electronic apparatus 701, or one or more other components may be added to the electronic apparatus 701. In some embodiments, some (e.g., the sensor module 776, the camera module 780, or the antenna module 797) of the components may be integrated as a single component (e.g., the display module 760).

The processor 720 may execute, for example, software (e.g., a program 740) to control at least one other component (e.g., a hardware or software component) of the electronic apparatus 701 connected to the processor 720, and may perform various data processing or computation. According to an embodiment, as at least a part of data processing or computation, the processor 720 may store a command or data received from another component (e.g., the sensor module 776 or the communication module 790) in a volatile memory 732, process the command or the data stored in the volatile memory 732, and store resulting data in a non-volatile memory 734. According to an embodiment, the processor 720 may include a main processor 721 (e.g., a central processing unit (CPU) or an application processor (AP)) or an auxiliary processor 723 (e.g., a graphics processing unit (GPU), a neural processing unit (NPU), an image signal processor (ISP), a sensor hub processor, or a communication processor (CP)) that is operable independently from, or in conjunction with the main processor 721. For example, when the electronic apparatus 701 includes the main processor 721 and the auxiliary processor 723, the auxiliary processor 723 may be adapted to consume less power than the main processor 721 or to be specific to a specified function. The auxiliary processor 723 may be implemented as separate from, or as part of the main processor 721.

The auxiliary processor 723 may control at least some of functions or states related to at least one (e.g., the display module 760, the sensor module 776, or the communication module 790) of the components of the electronic apparatus 701, instead of the main processor 721 while the main processor 721 is in an inactive (e.g., sleep) state or together with the main processor 721 while the main processor 721 is in an active state (e.g., executing an application). According to an embodiment, the auxiliary processor 723 (e.g., an ISP or a CP) may be implemented as part of another component (e.g., the camera module 780 or the communication module 790) functionally related to the auxiliary processor 723. According to an embodiment, the auxiliary processor 723 (e.g., an NPU) may include a hardware structure specified for artificial intelligence model processing. An artificial intelligence model may be generated by machine learning. Such learning may be performed, for example, by the electronic apparatus 701 in which an artificial intelligence model is executed, or via a separate server (e.g., the server 708). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively include a software structure other than the hardware structure.

The memory 730 may store various pieces of data used by at least one component (e.g., the processor 720 or the sensor module 776) of the electronic apparatus 701. The various pieces of data may include, for example, software (e.g., the program 740) and input data or output data for a command related thereto. The memory 730 may include the volatile memory 732 or the non-volatile memory 734.

The program 740 may be stored as software in the memory 730, and may include, for example, an operating system (OS) 742, middleware 744, or an application 746.

The input module 750 may receive a command or data to be used by another component (e.g., the processor 720) of the electronic apparatus 701, from the outside (e.g., a user) of the electronic apparatus 701. The input module 750 may include, for example, a microphone, a mouse, a keyboard, a key (e.g., a button), or a digital pen (e.g., a stylus pen).

The sound output module 755 may output a sound signal to the outside of the electronic apparatus 701. The sound output module 755 may include, for example, a speaker or receiver. The speaker may be used for general purposes, such as playing multimedia or playing record. The receiver may be used to receive an incoming call. According to an embodiment, the receiver may be implemented as separate from, or as part of the speaker.

The display module 760 may visually provide information to the outside (e.g., a user) of the electronic apparatus 701. The display module 760 may include, for example, a display, a hologram device, or a projector and control circuitry to control a corresponding one of the display, hologram device, and projector. According to an embodiment, the display module 760 may include a touch sensor adapted to sense a touch, or a pressure sensor adapted to measure the intensity of force incurred by the touch.

The audio module 770 may convert a sound into an electrical signal and vice versa. According to an embodiment, the audio module 770 may obtain the sound via the input module 750 or output the sound via the sound output module 755 or an external electronic apparatus (e.g., the electronic apparatus 702 such as a speaker or headphones) directly or wirelessly connected to the electronic apparatus 701.

The sensor module 776 may detect an operational state (e.g., power or temperature) of the electronic apparatus 701 or an environmental state (e.g., a state of a user) external to the electronic apparatus 701, and generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic apparatus 701 to be coupled with the external electronic apparatus (e.g., the electronic apparatus 702) directly (e.g., by wire) or wirelessly. According to an embodiment, the interface 777 may include, for example, a high-definition multimedia interface (HDMI), a universal serial bus (USB) interface, a secure digital (SD) card interface, or an audio interface.

The connecting terminal 778 may include a connector via which the electronic apparatus 701 may be physically connected to the external electronic apparatus (e.g., the electronic apparatus 702). According to an embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via his or her tactile sensation or kinesthetic sensation. According to an embodiment, the haptic module 779 may include, for example, a motor, a piezoelectric element, or an electric stimulator.

The camera module 780 may capture a still image and moving images. According to an embodiment, the camera module 780 may include one or more lenses, image sensors, ISPs, or flashes.

The power management module 788 may manage power supplied to the electronic apparatus 701. According to an embodiment, the power management module 788 may be implemented as at least part of, for example, a power management integrated circuit (PMIC).

The battery 789 may supply power to at least one component of the electronic apparatus 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic apparatus 701 and the external electronic apparatus (e.g., the electronic apparatus 702, the electronic apparatus 704, or the server 708) and performing communication via the established communication channel. The communication module 790 may include one or more CPs that are operable independently of the processor 720 (e.g., an AP) and that support a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module, or a power line communication (PLC) module). A corresponding one of these communication modules may communicate with the electronic apparatus 704 via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multiple chips) separate from each other. The wireless communication module 792 may identify and authenticate the electronic apparatus 701 in a communication network, such as the first network 798 or the second network 799, using subscriber information (e.g., IMSI) stored in the SIM 796.

The wireless communication module 792 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., an mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 792 may support various requirements specified in the electronic apparatus 701, an external electronic apparatus (e.g., the electronic apparatus 704), or a network system (e.g., the second network 799). According to an embodiment, the wireless communication module 792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 797 may transmit or receive a signal or power to or from the outside (e.g., an external electronic apparatus) of the electronic apparatus 701. According to an embodiment, the antenna module 797 may include an antenna including a radiating element including a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in a communication network, such as the first network 798 or the second network 799, may be selected by, for example, the communication module 790 from the plurality of antennas. The signal or power may be transmitted or received between the communication module 790 and the external electronic apparatus via the at least one selected antenna. According to an embodiment, another component (e.g., a radio frequency integrated circuit (RFIC)) other than the radiating element may be additionally formed as part of the antenna module 797.

According to an embodiment, the antenna module 797 may form an mmWave antenna module. According to an embodiment, the mmWave antenna module may include a PCB, an RFIC disposed on a first surface (e.g., the bottom surface) of the PCB or adjacent to the first surface and capable of supporting a designated a high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic apparatus 701 and the external electronic apparatus 704 via the server 708 coupled with the second network 799. Each of the external electronic apparatuses 702 and 704 may be a device of the same type as or a different type from the electronic apparatus 701. According to an embodiment, all or some of operations to be executed at the electronic apparatus 701 may be executed at one or more external electronic apparatuses (e.g., the external electronic apparatuses 702 and 704, or the server 708). For example, if the electronic apparatus 701 needs to perform a function or a service automatically, or in response to a request from a user or another device, the electronic apparatus 701, instead of, or in addition to, executing the function or the service, may request one or more external electronic apparatuses to perform at least part of the function or the service. The one or more external electronic apparatuses receiving the request may perform the at least part of the function or the service requested, or an additional function or an additional service related to the request, and transfer an outcome of the performing to the electronic apparatus 701. The electronic apparatus 701 may provide the outcome, with or without further processing of the outcome, as at least part of a reply to the request. To that end, a cloud computing, distributed computing, MEC, or client-server computing technology may be used, for example. The electronic apparatus 701 may provide ultra-low-latency services using, e.g., distributed computing or MEC. In an embodiment, the external electronic apparatus 704 may include an Internet-of-things (IoT) device. The server 708 may be an intelligent server using machine learning and/or a neural network. According to an embodiment, the external electronic apparatus 704 or the server 708 may be included in the second network 799. The electronic apparatus 701 may be applied to intelligent services (e.g., a smart home, a smart city, a smart car, or healthcare) based on 5G communication technology or IoT-related technology.

Figure 8:
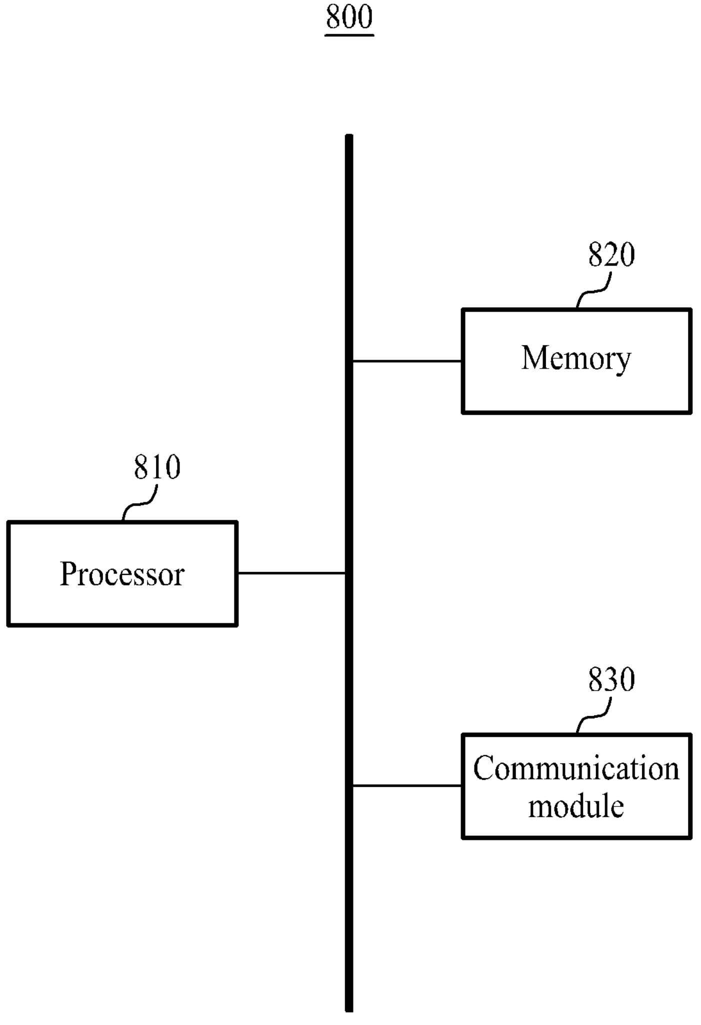
FIG. 8 illustrates a configuration of a network core server according to one or more embodiments.

FIG. 8 is a block diagram illustrating a configuration of a network core server according to one or more embodiments. Referring to FIG. 8, a network core server 800 may include a processor 810, a memory 820, and a communication module 830. The memory 820 may include instructions executable by the processor, and when the instructions are executed by the processor 810, the processor 810 may perform the operations described with reference to FIGS. 1 to 7.

According to one or more embodiments, the processor 810 may identify a terminal corresponding to a subscriber of an edge computing service based on service authorization information of the terminal, detect a movement of the terminal from a first edge cluster to a second edge cluster, and perform an action, resulting from (or based on) the movement of the terminal, related to at least one of a first edge control server of the first edge cluster and a second edge control server of the second edge cluster. The service authorization information may include a UE usage type of the terminal.

The UE usage type may be stored in an HSS. The processor 810 may re-select a user plane device in response to the movement of the terminal. When a service state of the terminal is an active state, the processor 810 may delay the re-selection until the service state becomes an idle state. When the service state is the idle state, the processor 810 may perform the re-selection.

The processor 810 may request the first edge control server to delete subscriber information of the terminal and transmit the subscriber information of the terminal to the second edge control server. The subscriber information may include at least one of IMSI, an IP address, an EGCI, a TAI, an APNNI, and a UE usage type of the terminal.

When a cell change of the terminal is detected in the second edge cluster, the processor 810 may notify the cell change of the terminal to the second edge control server. The processor 810 may receive an audit query for the terminal from a third edge control server of a third edge cluster and transmit the subscriber information of the terminal to the third edge control server.

In addition, the description of FIGS. 1 to 7 may apply to the network core server 800.

The electronic apparatus according to the embodiments disclosed herein may be one of various types of electronic apparatuses. The electronic apparatuses may include, for example, a portable communication device (e.g., a smartphone), a computer device, a portable multimedia device, a portable medical device, a camera, a wearable device, or a home appliance. According to an embodiment of the disclosure, the electronic apparatus is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B or C”, “at least one of A, B and C”, and “at least one of A, B, or C”, may include any one of, or all possible combinations of the items enumerated together in a corresponding one of the phrases. As used herein, such terms as and "$2^{nd}$," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software including one or more instructions that are stored in a storage medium (e.g., the memory 820) that is readable by a machine (e.g., the network core server 111 and the network core server 800). For example, a processor (e.g., the processor 810) of the machine (e.g., the network core server 111 and the network core server 800) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A control method for an edge computing service, comprising:

identifying a terminal corresponding to a subscriber of the edge computing service based on service authorization information of the terminal;

detecting a movement of the terminal from a first edge cluster to a second edge cluster; and performing an action, based on the movement of the terminal, related to at least one of a first edge control server of the first edge cluster and a second edge control server of the second edge cluster, wherein the service authorization information comprises a user equipment usage type of the terminal stored in a home subscriber server, and wherein the user equipment usage type of the terminal corresponds to a multi-access edge computing (MEC) value predetermined and assigned to an edge control server, which is different from a network core server, by a mobile telecommunication service provider.

2. The control method of claim 1, further comprising performing a re-selection of a user plane device based on the movement of the terminal.

3. The control method of claim 2, wherein the performing the re-selection of the user plane device comprises:

based on a service state of the terminal that is an active state, delaying the re-selection until the service state becomes an idle state; and based on the service state that is the idle state, performing the re-selection.

4. The control method of claim 1, wherein the detecting of the movement of the terminal comprises detecting the movement of the terminal from a first network area belonging to the first edge cluster to a second network area belonging to the second edge cluster.

5. The control method of claim 1, wherein the performing of the action comprises:

requesting the first edge control server to delete subscriber information of the terminal; and transmitting the subscriber information of the terminal to the second edge control server.

6. The control method of claim 5, wherein the subscriber information comprises at least one of:

international mobile subscriber identity (IMSI), an internet protocol (IP) address, an evolved universal terrestrial access network (E-UTRAN) cell global identifier (EGCI), a tracking area identifier (TAI), an access point name network identifier (APNNI), and a user equipment usage type of the terminal.

7. The control method of claim 1, further comprising, based on a cell change of the terminal, which is detected in the second edge cluster, notifying the cell change to the second edge control server.

8. The control method of claim 1, further comprising:
receiving an audit query for the terminal from a third edge control server of a third edge cluster; and
transmitting subscriber information of the terminal to the third edge control server.

9. The control method of claim 1, wherein the control method is performed by the network core server.

10. A network core server comprising:
a processor; and
a memory configured to store instructions executable by the processor,
wherein, based on the instructions being executed by the processor, the processor is configured to:
identify a terminal corresponding to a subscriber of an edge computing service based on service authorization information of the terminal;
detect a movement of the terminal from a first edge cluster to a second edge cluster; and
perform an action, based on the movement of the terminal, related to at least one of a first edge control server of the first edge cluster and a second edge control server of the second edge cluster, and
wherein the service authorization information comprises a user equipment usage type of the terminal, and
wherein the user equipment usage type of the terminal corresponds to a multi-access edge computing (MEC) value predetermined and assigned to an edge control server, which is different from the network core server, by a mobile telecommunication service provider.

11. The network core server of claim 10, wherein the processor is further configured to perform a re-selection of a user plane device based on the movement of the terminal.

12. The network core server of claim 11, wherein the processor is further configured to:
based on a service state of the terminal that is an active state, delay the re-selection until the service state becomes an idle state; and
based on the service state is the idle state, perform the re-selection.

13. The network core server of claim 10, wherein the processor is further configured to:
request the first edge control server to delete subscriber information of the terminal, and
transmit the subscriber information of the terminal to the second edge control server.

14. A control method for an edge computing service, comprising:
identifying a terminal corresponding to a subscriber of the edge computing service;
detecting a movement of the terminal from a first edge cluster to a second edge cluster; and
performing an action, based on the movement of the terminal, related to at least one of a first edge control server of the first edge cluster and a second edge control server of the second edge cluster;
performing a re-selection a user plane device based on the movement of the terminal,
wherein the performing the re-selection of the user plane device comprises:
based on a service state of the terminal that is an active state, delaying the re-selection until the service state becomes an idle state; and
based on the service state that is the idle state, performing the re-selection.

15. The control method of claim 14, wherein the detecting of the movement of the terminal comprises detecting the movement of the terminal from a first network area belonging to the first edge cluster to a second network area belonging to the second edge cluster.

16. The control method of claim 14, wherein the performing of the action comprises:
requesting the first edge control server to delete subscriber information of the terminal; and
transmitting the subscriber information of the terminal to the second edge control server,
wherein the subscriber information comprises at least one of:
international mobile subscriber identity (IMSI),
an internet protocol (IP) address,
an evolved universal terrestrial access network (E-UTRAN) cell global identifier (EGCI),
a tracking area identifier (TAI),
an access point name network identifier (APNNI), and
a user equipment usage type of the terminal.

17. The control method of claim 14, further comprising, based on a cell change of the terminal, which is detected in the second edge cluster, notifying the cell change to the second edge control server.

18. The control method of claim 14, further comprising:
receiving an audit query for the terminal from a third edge control server of a third edge cluster; and
transmitting subscriber information of the terminal to the third edge control server.

* * * * *